(12) United States Patent
Kang et al.

(10) Patent No.: US 12,133,009 B2
(45) Date of Patent: Oct. 29, 2024

(54) IMAGE SENSOR, IMAGE SENSING SYSTEM, AND IMAGE SENSING METHOD

(71) Applicant: SAMSUNG ELECTRONICS CO., LTD., Suwon-si (KR)

(72) Inventors: Jeong Soon Kang, Gumi-si (KR); Hyun Cheol Kim, Seoul (KR); Woo Bin Song, Hwaseong-si (KR); Kyung Hwan Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 148 days.

(21) Appl. No.: 18/086,449

(22) Filed: Dec. 21, 2022

(65) Prior Publication Data

US 2023/0269501 A1    Aug. 24, 2023

(30) Foreign Application Priority Data

Feb. 22, 2022    (KR) .......................... 10-2022-0023058

(51) Int. Cl.
*H04N 25/77* (2023.01)
*H04N 25/51* (2023.01)
*H04N 25/59* (2023.01)
*H04N 25/709* (2023.01)
*H04N 25/76* (2023.01)

(52) U.S. Cl.
CPC ........... *H04N 25/77* (2023.01); *H04N 25/709* (2023.01)

(58) Field of Classification Search
CPC .... H04N 25/77; H04N 25/709; H04N 25/771; H04N 25/51; H04N 25/59; H04N 25/766; H01L 28/40
See application file for complete search history.

(56) References Cited

U.S. PATENT DOCUMENTS

| | | |
|---|---|---|
| 5,953,061 A * | 9/1999 | Biegelsen .............. H04N 25/77 348/308 |
| 10,032,825 B2 | 7/2018 | Altice, Jr. et al. |
| 10,218,924 B2 | 2/2019 | Manabe et al. |
| 10,397,500 B1 | 8/2019 | Xu et al. |
| 10,510,796 B1 | 12/2019 | Wang et al. |
| 10,559,614 B2 | 2/2020 | Oh |
| 10,756,129 B2 | 8/2020 | Geurts |
| 10,791,292 B1 | 9/2020 | Geurts |

(Continued)

*Primary Examiner* — Marly S Camargo
(74) *Attorney, Agent, or Firm* — Sughrue Mion, PLLC

(57) ABSTRACT

An image sensor includes a photoelectric converter configured to convert received light into charges in response to the received light and provide the charges to a first node, a transfer transistor configured to provide a voltage of the first node to a floating diffusion node, a reset transistor configured to reset a voltage of the floating diffusion node to a driving voltage based on a reset signal, a source follower transistor configured to provide a unit pixel output based on the voltage of the floating diffusion node, a select transistor connected to the source follower transistor and gated with a selection signal to output the unit pixel output to the outside, and a ferroelectric capacitor connected to the floating diffusion node, wherein the ferroelectric capacitor is configured to adjust a conversion gain of the floating diffusion node based on a conversion gain mode of the ferroelectric capacitor, the conversion gain mode being a first conversion gain mode, a second conversion gain mode, or a third conversion gain mode.

20 Claims, 18 Drawing Sheets

(56) References Cited

U.S. PATENT DOCUMENTS

| | | |
|---|---|---|
| 10,834,342 B2 | 11/2020 | Johnson |
| 11,282,891 B2 * | 3/2022 | Altice .................... H04N 25/65 |
| 2007/0152133 A1 | 7/2007 | He et al. |
| 2019/0386057 A1 * | 12/2019 | Wang ................ H01L 27/14641 |
| 2021/0242257 A1 * | 8/2021 | Lee ................... H01L 27/14612 |
| 2021/0243350 A1 | 8/2021 | Johnson |

* cited by examiner

112_1

IMAGE SENSOR, IMAGE SENSING SYSTEM, AND IMAGE SENSING METHOD

CROSS-REFERENCE TO RELATED APPLICATION

This application is based on and claims priority from Korean Patent Application No. 10-2022-0023058 filed on Feb. 22, 2022, in the Korean Intellectual Property Office, the disclosure of which is incorporated by reference herein in its entirety.

BACKGROUND

1. Field

The disclosure relates to an image sensor, an image sensing system, and an image sensing method, and more particularly, to an image sensor using a ferroelectric capacitor, an image sensing system, and an image sensing method.

2. Description of Related Art

An image sensing device may be an element of a semiconductor device that is configured to convert optical information into an electrical signal. Such an image sensing device may include a charge coupled device (CCD) image sensing device and a complementary metal-oxide semiconductor (CMOS) image sensing device.

A CMOS images sensor (CIS) may include a plurality of pixels that are two-dimensionally arranged, and each of the pixels may include, for example, a photodiode (PD). The photodiode may convert incident light into an electrical signal.

With the recent development of the computer industry and the communication industry, the demand for an image sensor with reduced size and improved performance is increasing in various fields such as digital cameras, camcorders, smartphones, game devices, security service cameras, medical micro cameras, robots, automobiles, etc.

SUMMARY

Aspects of the disclosure provide an image sensor with improved image quality.

Aspects of the disclosure also provide an image sensing method providing improved image quality.

Aspects of the disclosure also provide an image sensing system with improved image quality.

In accordance with an aspect of the disclosure, an image sensor includes a photoelectric converter configured to convert received light into charges in response to the received light and provide the charges to a first node; a transfer transistor configured to provide a voltage of the first node to a floating diffusion node; a reset transistor configured to reset a voltage of the floating diffusion node to a driving voltage based on a reset signal; a source follower transistor configured to provide a unit pixel output based on the voltage of the floating diffusion node; a select transistor connected to the source follower transistor and gated with a selection signal to output the unit pixel output to the outside; and a ferroelectric capacitor connected to the floating diffusion node, wherein the ferroelectric capacitor is configured to adjust a conversion gain of the floating diffusion node based on a conversion gain mode of the ferroelectric capacitor, the conversion gain mode including a first conversion gain mode, a second conversion gain mode, or a third conversion gain mode.

In accordance with an aspect of the disclosure, An image sensing system includes an image sensor configured to output an image signal; and an image signal processor (ISP) electrically connected to the image sensor and configured to receive the image signal from the image sensor and process the image signal, wherein the image sensor includes a photoelectric converter configured to convert received light into charges in response to the received light and provide the charges to a first node, a transfer transistor configured to provide a voltage of the first node to a floating diffusion node, a reset transistor configured to reset a voltage of the floating diffusion node to a driving voltage based on a reset signal, and a ferroelectric capacitor connected to the floating diffusion node, wherein the ferroelectric capacitor is configured to adjust a conversion gain of the floating diffusion node based on a conversion gain mode of the ferroelectric capacitor, the conversion gain mode including a first conversion gain mode, a second conversion gain mode, or a third conversion gain mode.

In accordance with an aspect of the disclosure, an image sensing method in which a ferroelectric capacitor having one end connected to a floating diffusion node and the other end connected to a ground source, a first transistor having one end connected to the one end of the ferroelectric capacitor and the other end connected to a plate line, and a second transistor having one end connected to the one end of the ferroelectric capacitor and the other end connected to the floating diffusion node are provided, includes adjusting a conversion gain of the floating diffusion node by operations of the ferroelectric capacitor, the first transistor, and the second transistor, wherein the conversion gain is adjusted based on a conversion gain mode of the ferroelectric capacitor, the conversion gain mode comprising a first conversion gain mode, a second conversion gain mode, or a third conversion gain mode wherein in to the first conversion gain mode, the image sensing method includes turning on the first transistor at a first time point that is before provision of charges, which are generated in response to received light, to the floating diffusion node, turning on the second transistor at a second time point that is after the first time point, and applying a ferroelectric capacitor reset voltage to the plate line at the first time point, wherein in the second conversion gain mode, the image sensing method includes turning on the first transistor at a third time point that is before the provision of charges, which are generated in response to the received light, to the floating diffusion node, and turning off the first transistor at a fourth time point that is after the third time point, and applying a first ferroelectric capacitor reset voltage to the plate line at the third time point and applying a second ferroelectric capacitor reset voltage, different from the first ferroelectric capacitor reset voltage, to the plate line at a fifth time point between the third time point and the fourth time point, and wherein in the third conversion gain mode, the image sensing method includes turning off the first transistor and the second transistor.

However, aspects of the disclosure are not restricted to those set forth herein. The above and other aspects of the disclosure will become more apparent to one of ordinary skill in the art to which the disclosure pertains by referencing the detailed description of the disclosure given below.

It should be noted that the effects of the disclosure are not limited to those described above, and other effects of the disclosure will be apparent from the following description.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION OF EMBODIMENTS

Figure 1:
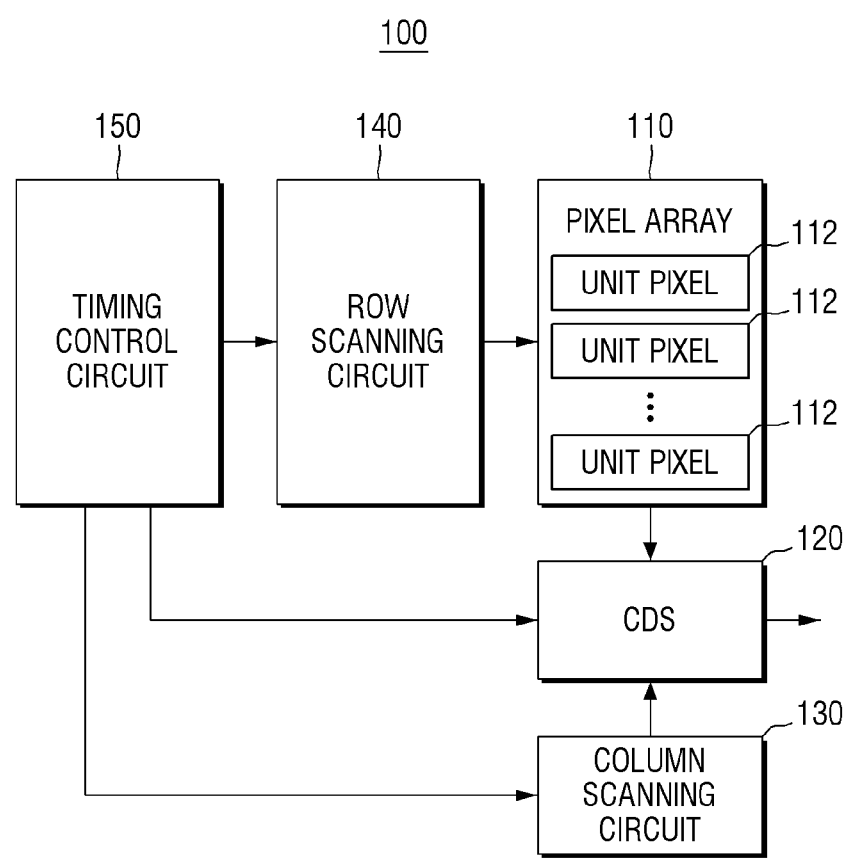
FIG. 1 is a block diagram illustrating an image sensor according to an embodiment.

Hereinafter, embodiments of the disclosure will be described with reference to the attached drawings.

It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present. Like numerals refer to like elements throughout.

Spatially relative terms, such as "over," "above," "on," "upper," "below," "under," "beneath," "lower," and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

For the sake of brevity, conventional elements to semiconductor devices may or may not be described in detail herein for brevity purposes.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like.

FIG. 1 is a block diagram illustrating an image sensor according to some embodiments.

Referring to FIG. 1, an image sensor 100 according to some embodiments may include a pixel array 110, a correlated double sampler (CDS) 120, a column scanning circuit 130, a row scanning circuit 140, and a timing control circuit 150.

The pixel array 110 may include a plurality of unit pixels 112. The plurality of unit pixels 112 may be arranged in a matrix form.

Structures of the unit pixels 112 may be classified into a 3-transistors structure, a 4-transistors structure, a 5-transistors structure, a 6-transistor structure, or the like, according to the number of transistors included in a signal generation circuit.

Row selection lines may be arranged along rows of the unit pixels 112 in the pixel array 110, and column selection lines may be arranged along columns of the unit pixels 112 in the pixel array 110. For example, when the pixel array 110 includes M×N unit pixels 112 (where M and N are integer values of 2 or greater), first to M-th row selection lines and first to N-th column selection lines may be provided for the M×N unit pixels 112 in the pixel array 110.

In some embodiments, when the image sensor 100 has a Bayer pattern, the unit pixels 112 in the pixel array 110 may include pixels for receiving or detecting red (R) light, pixels for receiving or detecting green (G) light, and pixels for receiving or detecting blue (B) light. Alternatively, the unit pixels 112 in the pixel array 110 may include pixels for receiving or detecting magenta (Mg) light, pixels for receiving and detecting yellow (Y) light, pixels for receiving or detecting cyan (Cy) light, and/or pixels for receiving or detecting white (W) light. However, embodiments are not limited thereto.

The CDS 120 may include a number of analog-to-digital converters (ADCs) including comparators, counters, latches, and the like. The CDS 120 may be controlled by the timing control circuit 150. The CDS 120 may operate for each cycle during which the row scanning circuit 140 selects the row selection line of the pixel array 110, i.e., for each row scan cycle.

The row scanning circuit 140 may receive control signals from the timing control circuit 150. The row scanning circuit 140 may control a row addressing operation and a row scanning operation on the pixel array 110 in response to the received control signals. At this time, to select a particular row selection line among the row selection lines, the row scanning circuit 140 may apply a signal that activates the selected row selection line to the pixel array 110. The row scanning circuit 140 may include a row decoder which selects the row selection line in the pixel array 110 and a row driver which provides the signal for activating the selected row selection line.

The column scanning circuit 130 may receive the control signals from the timing control circuit 150. The column scanning circuit 130 may control a column addressing operation and a column scanning operation on the pixel array 110 in response to the received control signals. At this time, the column scanning circuit 130 may output a digital output signal, which is then output from the CDS 120, to a digital signal processor (DSP), an image signal processor (ISP), or an external host.

For example, the column scanning circuit 130 may sequentially select a number of ADCs in the CDS 120 by outputting a horizontal scan control signal to the CDS 120. In some embodiments, the column scanning circuit 130 may include a column decoder which selects one of the ADCs, and a column driver which induces the output of the selected unit ADC to a horizontal transfer line. The horizontal transfer line may have a bit width for outputting the digital output signal.

The timing control circuit 150 may control the CDS 120, the column scanning circuit 130, and the row scanning circuit 140, and may supply control signals, such as a clock signal and a timing control signal, required for operating the CDS 120, the column scanning circuit 130, and the row scanning circuit 140. The timing control circuit 150 may include a logic control circuit, a phase lock loop (PLL) circuit, a timing control circuit, and a communication interface circuit.

Figure 2:
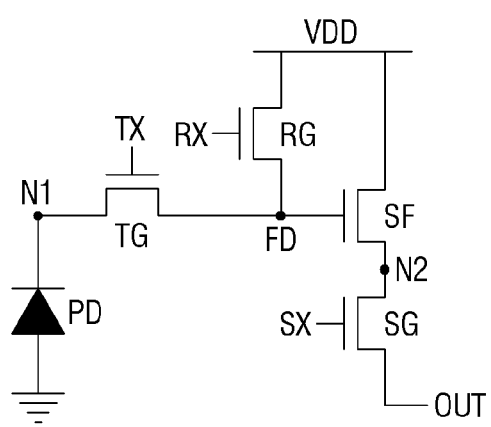
FIG. 2 is a circuit diagram of a unit pixel of an image sensor according to an embodiment.

FIG. 2 is a circuit diagram of a unit pixel of an image sensor according to some embodiments. FIGS. 3 to 6 are circuit diagrams for describing operations of a unit pixel of an image sensor according to some embodiments. Unit pixel 112_1 according to some embodiments will be described with reference to FIGS. 2 to 6.

Referring to FIG. 2, a unit pixel 112_1 according to some embodiments may include a photoelectric converter PD, a transfer transistor TG, a reset transistor RG, a source follower transistor SF, and a select transistor SG.

According to some embodiments, one end of the photoelectric converter PD may be connected to a first node N1, and another end of the photoelectric converter PD may be connected to, for example, a ground source.

The photoelectric converter PD may generate photoelectric charges in response to external light incident thereupon. In other words, the photoelectric converter PD may receive the external light and may convert the received light into an electrical signal. The photoelectric converter PD may provide the electrical signal to the first node N1. For example, when the photoelectric converter PD receives a relatively large amount of light, the photoelectric converter PD may generate a relatively large amount of charges.

Figure 3:
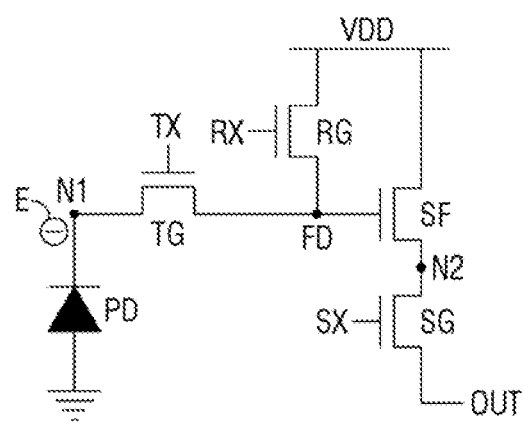
FIGS. 3 to 6 are circuit diagrams for describing operations of a unit pixel of an image sensor according to an embodiment.

Referring to FIG. 3, the photoelectric converter PD may generate electrons in response to light incident from the outside. The generated electrons may be provided to the first node N1. In other words, when the photoelectric converter PD receives the incident light, a voltage level of the first node N1 may be lowered. For example, when the photoelectric converter PD receives a relatively large amount of light, the voltage level of the first node N1 may be relatively further lowered.

In some diagrams, the photoelectric converter is illustrated by a symbol of a photodiode, but this is for convenience of description, and embodiments are not limited thereto. In addition to a photodiode, the photoelectric converter PD may include, for example, a photo transistor, a photo gate, a pinned photodiode (PPD), an organic photodiode (OPD), a quantum dot (QD), or combinations thereof.

According to some embodiments, the transfer transistor TG may be connected to the first node N1 and a floating diffusion node FD. A gate terminal of the transfer transistor TG may be connected to a transfer line receiving a transmission signal TX.

In some embodiments, the transmission signal TX may be provided to the transfer line. In other words, the transmission signal TX may be provided to the gate terminal of the transfer transistor TG. For example, the transmission signal TX may turn on or off the transfer transistor TG.

When the transfer transistor TG is turned on, the first node N1 and the floating diffusion node FD may be electrically connected to each other. In other words, when the transfer transistor TG is turned on, the voltage level of the first node N1 may be applied to the floating diffusion node FD. For example, when the transfer transistor TG is turned on, the voltage level of the first node N1 changed by the photoelectric converter PD may be transmitted to the floating diffusion node FD.

For example, when no light is received by the photoelectric converter PD, the voltage level of the floating diffusion node FD may not be changed even if the transfer transistor TG is turned on. When a relatively small amount of light is received by the photoelectric converter PD, the voltage level of the floating diffusion node FD may be relatively less decreased in response to the transfer transistor TG being turned on. On the other hand, when a relatively large amount of light is received by the photoelectric converter PD, the voltage level of the floating diffusion node FD may be relatively further decreased in response to the transfer transistor TG being turned on.

Figure 4:
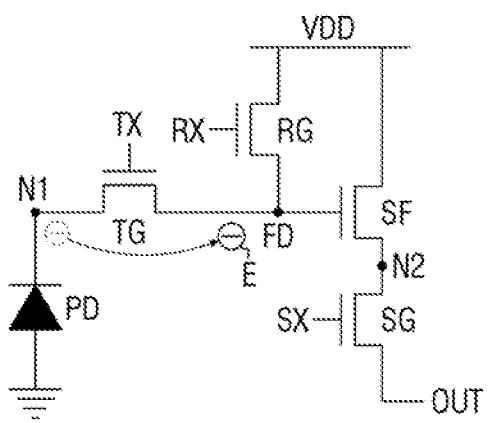

Referring to FIG. 4, when the transfer transistor TG is turned on, the electrons E charged in the first node N1 may be provided to the floating diffusion node FD. Since the electrons E are provided to the floating diffusion node FD, the voltage level of the floating diffusion node FD may be decreased.

The transfer transistor TG may be implemented as an N-type metal oxide semiconductor (NMOS) transistor, a P-type metal oxide semiconductor (PMOS) transistor, or a complementary metal oxide semiconductor (CMOS) transistor, but embodiments are not limited thereto.

According to some embodiments, the reset transistor RG may be connected to the floating diffusion node FD and a first voltage source VDD. The reset transistor RG may be gated with a reset signal RX. In other words, the reset transistor RG may be turned on or off in response to the reset signal RX.

In some embodiments, the reset signal RX may have a high level and a low level. For example, when the reset signal RX has a high level, the reset transistor RG may be turned on. When the reset signal RX has a low level, the reset transistor RG may be turned off.

In some embodiments, the voltage level of the first voltage source VDD may be referred to as a reference voltage level VDD. In some embodiments, both the first voltage source VDD and the reference voltage level may be referred to by "VDD". When the reset transistor RG is turned on, the first voltage source VDD and the floating diffusion node FD may be electrically connected to each other. When the reset transistor RG is turned off, the first voltage source VDD and the floating diffusion node FD may be electrically disconnected from each other. In other words, when the reset transistor RG is turned on, the voltage level of the first voltage source VDD may be applied to the floating diffusion node FD. That is, when the reset transistor RG is turned on, the floating diffusion node FD may be reset to be equal to the reference voltage level VDD. In some embodiments, the voltage level of the first node N1 may be lowered according to the amount of light received by the photoelectric converter PD. At this time, when the transfer transistor TG is turned on, the voltage level of the floating diffusion node FD may be decreased. Then, when the reset transistor RG is turned on, the voltage level of the floating diffusion node FD may rise back to the reference voltage level.

The reset transistor RG may be implemented as an NMOS transistor, a PMOS transistor, or a CMOS transistor, but embodiments are not limited thereto.

According to some embodiments, the source follower transistor SF may be connected to a second node N2 and the first voltage source VDD. A gate terminal of the source follower transistor SF may be connected to the floating diffusion node FD. In other words, the gate terminal of the source follower transistor SF may receive the voltage level of the floating diffusion node FD.

In some embodiments, the source follower transistor SF may provide a predetermined voltage level to the second node N2 in accordance with the voltage level of the floating diffusion node FD. In other words, the source follower transistor SF may provide a unit pixel output based on the voltage of the floating diffusion node FD.

In some embodiments, the range of the voltage level of the floating diffusion node FD may fall within the range of a saturation region of the source follower transistor SF. In other words, the source follower transistor SF may be constantly turned on. Also, the source follower transistor SF may flow a constant drain-source current.

In some embodiments, the source follower transistor SF may operate as a common drain amplifier. In other words, the source follower transistor SF may operate as a voltage buffer. In some embodiments, the voltage level of the floating diffusion node FD may be directly transmitted to the second node N2.

In some embodiments, the reset transistor RG and the source follower transistor SF may be connected to the first voltage source VDD. However, the disclosure is not limited thereto. For example, the reset transistor RG and the source follower transistor SF may be connected to different voltage sources, respectively.

Figure 5:
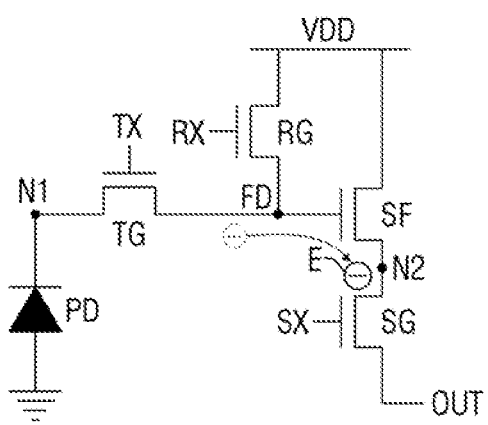

Referring to FIG. 5, the electrons provided from the first node N1 to the floating diffusion node FD may be provided to the second node N2 via the floating diffusion node FD. At this time, the voltage level of the second node N2 may be decreased.

According to some embodiments, the select transistor SG may be connected to an output terminal OUT of the unit pixel 112_1 and the second node N2. The select transistor SG may be gated with a selection signal SX. In other words, the gate terminal of the select transistor SG may receive the selection signal SX.

In some embodiments, the voltage level of the selection signal SX may include a high level and a low level. For example, when the selection signal SX has a high level, the select transistor SG may be turned on. When the selection signal SX has a low level, the select transistor SG may be turned off.

When the select transistor SG is turned on, the second node N2 and the output terminal OUT of the unit pixel 112_1 may be electrically connected to each other. In other words, when the select transistor SG is turned on, the voltage level of the second node N2 may be applied to the output terminal OUT of the unit pixel 112_1. In other words, when the select transistor SG is turned on, the voltage level provided from the source follower transistor SF based on the voltage of the floating diffusion node FD may be applied to the output terminal OUT of the unit pixel 112_1.

Figure 6:
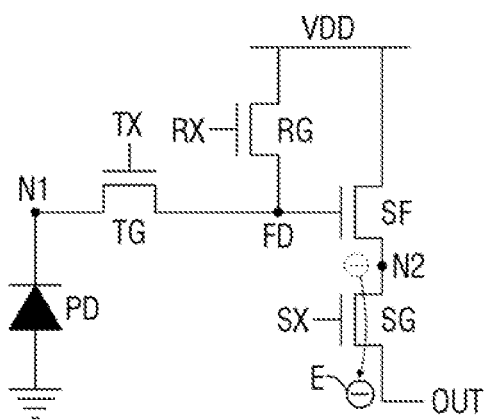

Referring to FIG. 6, when the select transistor SG is turned on, the electrons provided from the floating diffusion node FD to the second node N2 may be provided to the output terminal OUT of the unit pixel 112_1. At this time, the voltage level of the output terminal OUT of the unit pixel 112_1 may be decreased.

Figure 7:
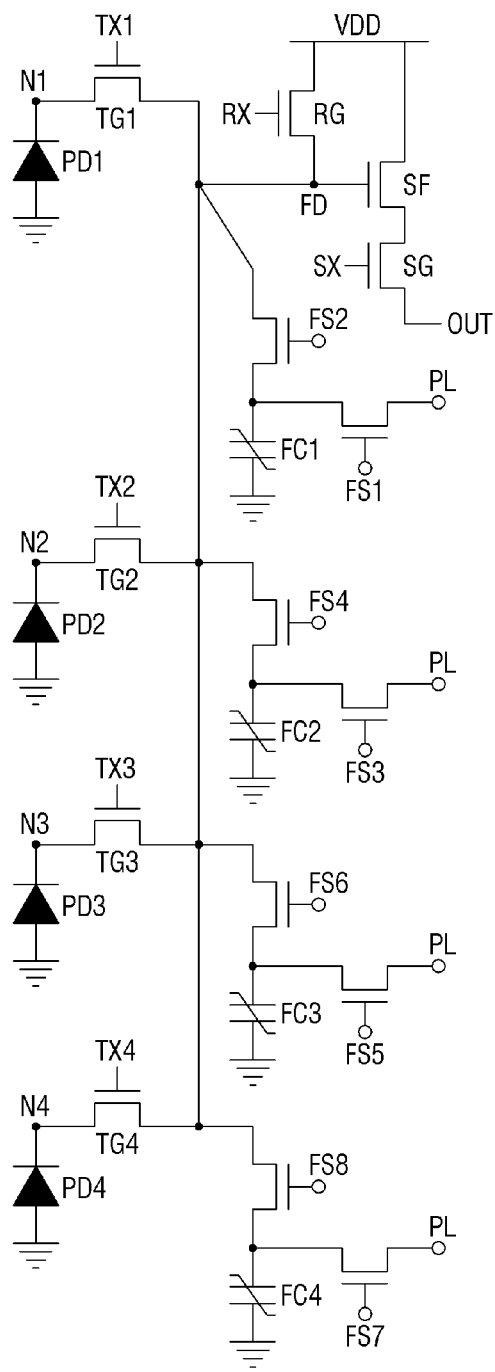
FIG. 7 is a circuit diagram of a unit pixel of an image sensor according to an embodiment.

FIG. 7 is a circuit diagram of a unit pixel of an image sensor according to some other embodiments. For convenience of explanation, descriptions of the same features or elements as those in the embodiment described above will be omitted or at least simplified.

Referring to FIG. 7, a unit pixel 112_3 according to some embodiments may include first to fourth photoelectric converters PD1 to PD4, first to fourth transfer transistors TG1 to TG4, a reset transistor RG, a source follower transistor SF, a select transistor SG, first to fourth ferroelectric capacitors FC1 to FC4, and first to eighth transistors FS1 to FS8.

According to some embodiments, one ends of the first to fourth photoelectric converters PD1 to PD4 may be connected to the first to fourth nodes N1 to N4, respectively, and the other ends of the first to fourth photoelectric converters PD1 to PD4 may be connected to, for example, a ground source.

The first to fourth photoelectric converters PD1 to PD4 may be the same as, or similar to, the photoelectric converter PD in FIGS. 2 through 6. For example, the first to fourth photoelectric converters PD1 to PD4 may generate electrons in response to light incident from the outside. The electrons generated by the first to fourth photoelectric converters PD1 to PD4 may be provided, respectively, to the first to fourth nodes N1 to N4. In other words, when the first to fourth photoelectric converters PD receive the incident light, voltage levels of the first to fourth nodes N1 to N4 may be lowered.

In some embodiments, the first to fourth photoelectric converters PD1 to PD4 may receive visible light of different wavelengths. Although not shown in the drawings, for example, color filters may be disposed on the first to fourth photoelectric converters PD1 to PD4 so that the first to fourth photoelectric converters PD1 to PD4 may receive visible light of different wavelengths.

For example, the first photoelectric converter PD1 may receive red (R) light. The second and third photoelectric converters PD2 and PD3 may receive green (G) light. The fourth photoelectric converter PD4 may receive blue (B) light.

For example, the first photoelectric converter PD1 may receive magenta (Mg) light. The second photoelectric converter PD2 may receive yellow (Y) light. The third photoelectric converter PD3 may receive cyan (Cy) light. The fourth photoelectric converter PD4 may receive white (W) light.

In some embodiments, the first to fourth transfer transistors TG1 to TG4 may be connected to the first to fourth nodes N1 to N4 and a floating diffusion node FD. Gate terminals of the first to fourth transfer transistors TG1 to TG4 may be connected to different transfer lines. In other words, the gate terminals of the first to fourth transfer transistors TG1 to TG4 may receive first to fourth transmission signals TX1 through TX4, respectively.

For example, the unit pixel 112_3 according to some embodiments may have a structure in which the floating diffusion node FD is shared by the first to fourth transfer transistors TG1 to TG4.

The unit pixel 112_3 according to some embodiments may adjust the magnitude of capacitance of the floating diffusion node FD using the first to fourth ferroelectric capacitors FC1 to FC4 connected to the floating diffusion node FD and the first to eighth transistors FS1 to FS8, which will be described in more detail below.

Figure 8:
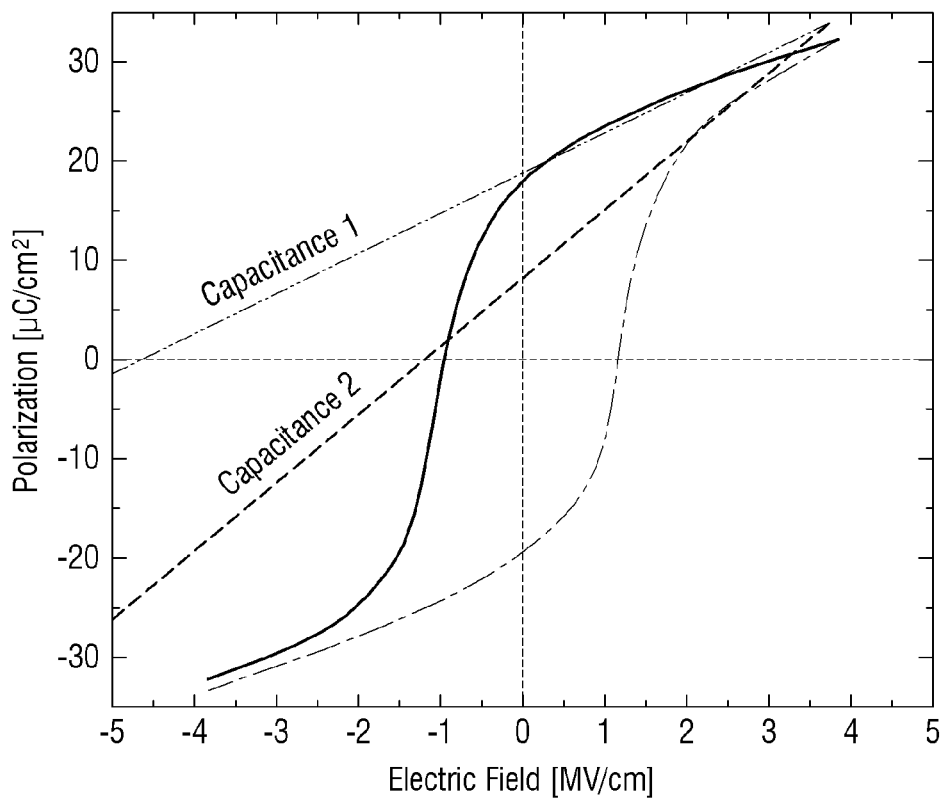
FIG. 8 is a graph for describing an operation of an image sensor according to an embodiment.

FIG. 8 is a graph for describing an operation of an image sensor according to some embodiments.

Referring to FIG. 8, a ferroelectric capacitor included in an image sensor, which will be described below, may operate on the illustrated graph. That is, FIG. 8 may illustrate a hysteresis curve for the ferroelectric capacitor. For example, the ferroelectric capacitor may include a material such as $HFO_x$, $HfO_2/ZrO_2$, or $PbTiO_3$, but embodiments are not limited thereto.

An inclination of a tangent (e.g., a slope) of each point in the hysteresis curve shown in FIG. 8 may mean the magnitude of capacitance of the ferroelectric capacitor.

The ferroelectric capacitor may perform different operations depending on the magnitude and direction of the voltage applied thereto. For example, the ferroelectric capacitor may have first capacitance (capacitance 1) in first conversion gain mode, and may have second capacitance (capacitance 2) in second conversion gain mode. For example, a value of the first capacitance (capacitance 1) may be smaller than a value of the second capacitance (capacitance 2), which will be described in more detail below.

Figure 9:
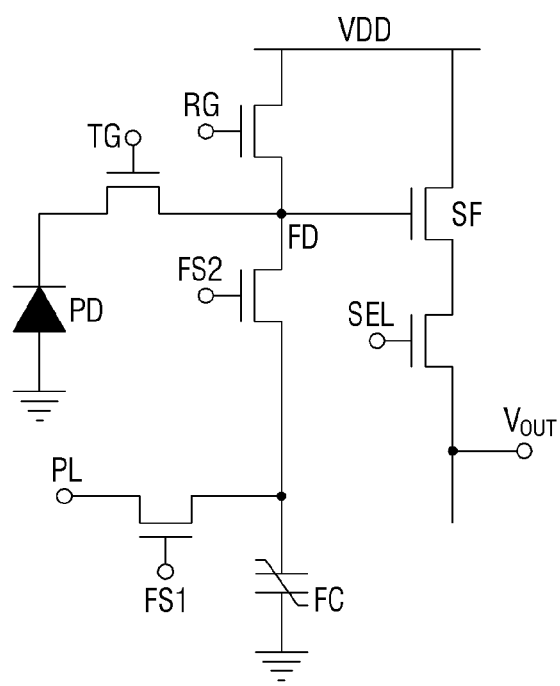
FIG. 9 is a circuit diagram of a unit pixel included in an image sensor according to an embodiment.

FIG. 9 is a circuit diagram of a unit pixel included in an image sensor according to some embodiments. Descriptions of the same features or elements as those in the embodiments of FIGS. 2 to 6 will be omitted and differences from FIGS. 2 to 6 will be mainly described.

Referring to FIG. 9, an image sensor may further include a first transistor FS1, a second transistor FS2, a ferroelectric capacitor FC, and a plate line PL.

One end of the first transistor FS1 may be connected to one end of the ferroelectric capacitor FC. The other end of the first transistor FS1 may be connected to the plate line PL.

One end of the second transistor FS2 may be connected to one end of the ferroelectric capacitor FC. The other end of the second transistor FS2 may be connected to the floating diffusion node FD.

One end of the ferroelectric capacitor FC may be connected to one end of the first transistor FS1 and one end of the second transistor FS2. In other words, the ferroelectric capacitor FC and the first transistor FS1 may be connected in parallel to each other. The other end of the ferroelectric capacitor FC may be connected to a ground source.

The plate line PL may be configured to apply a bias voltage that determines operations of the first transistor FS1, the ferroelectric capacitor FC, and the second transistor FS2, but embodiments are not limited thereto.

Although FIG. 9 illustrates that the first transistor FS1 and the second transistor FS2 are NMOS, the embodiments are not limited thereto.

Figure 10:
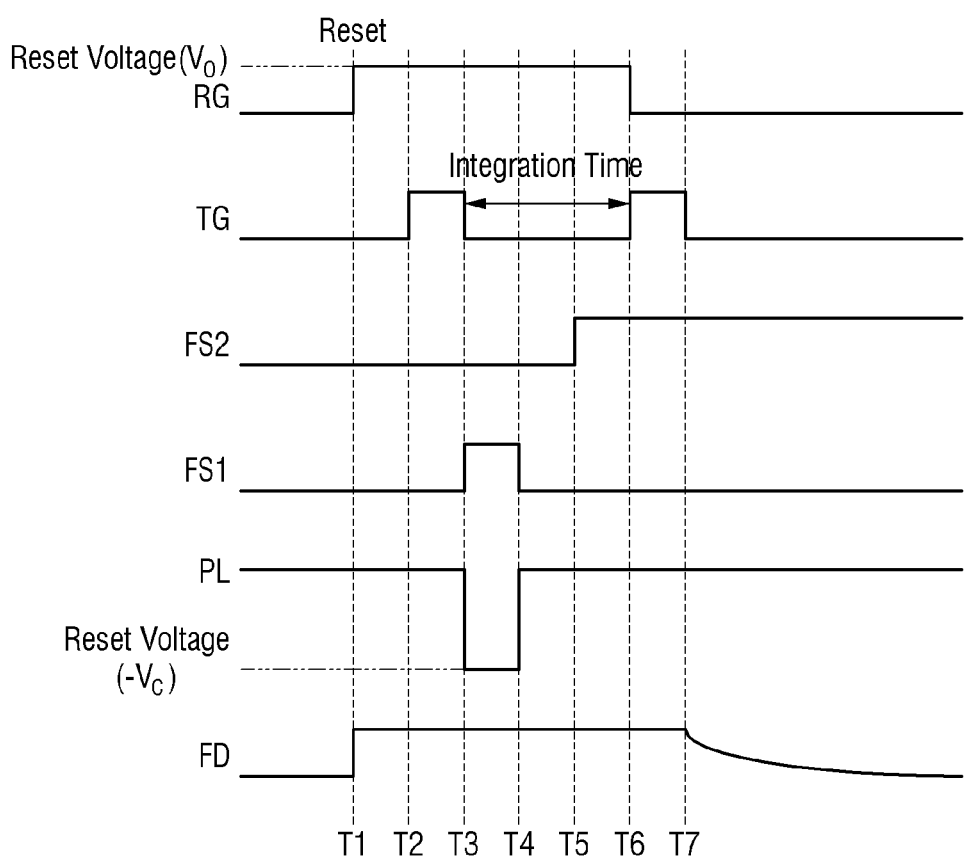
FIG. 10 is a timing diagram for explaining an operation of an image sensor according to an embodiment.

FIG. 10 is a timing diagram for explaining an operation of an image sensor according to some embodiments. Specifically, FIG. 10 is a timing diagram for explaining an operation of an image sensor in a first conversion gain mode that corresponds to a middle conversion gain of the image sensor.

Referring to FIG. 10, a reset transistor RG may be turned on at a first time point T1. The reset transistor RG may be turned on and reset the floating diffusion node FD to a reset voltage Vo. That is, the reset voltage Vo may mean a driving voltage VDD shown in FIG. 9. In response to the reset transistor RG being turned on, a voltage level of the floating diffusion node FD may rise.

At a second time point T2, the transfer transistor TG may be turned on. The transfer transistor TG is turned on to discharge charges in the photoelectric converter.

At a third time point T3, the transfer transistor TG may be turned off and the first transistor FS1 may be turned on. That is, in FIG. 9, the first transistor FS1 may be turned on to transmit the voltage applied to the plate line PL to the ferroelectric capacitor FC. Meanwhile, also at the third time point T3, a ferroelectric capacitor reset voltage may be applied to the plate line PL. The magnitude of the ferroelectric capacitor reset voltage may be a negative saturation voltage of the ferroelectric capacitor shown in FIG. 8, and the magnitude of the negative saturation voltage may vary according to the embodiment.

At a fourth time point T4, the first transistor FS1 is turned off, and the voltage being applied to the plate line PL may be no longer applied.

At a fifth time point T5, the second transistor FS2 may be turned on. As the second transistor FS2 is turned on, the floating diffusion node FD and the ferroelectric capacitor FC may be electrically connected to each other. Referring back to FIG. 8, the ferroelectric capacitor FC may have a value of the first capacitance (capacitance 1) due to the negative voltage applied to the plate line on the hysteresis curve.

At a sixth time point T6, the reset transistor RG may be turned off. Also at the sixth time point T6, the transfer transistor TG may be turned on. As the transfer transistor TG is turned on, charges generated in response to light received by the photoelectric converter may be provided to the floating diffusion node FD. The voltage caused by the charges provided to the floating diffusion node FD may have a middle conversion gain due to the ferroelectric capacitor FC having a value of the first capacitance (capacitance 1).

At a seventh time point T7, the transfer transistor TG may be turned off. Hence, the voltage level of the floating diffusion node FD may be dropped by the charges provided from the photoelectric converter. At this time, the floating diffusion node FD may have the middle conversion gain as a conversion gain, as described above, and a voltage level corresponding to the middle conversion gain may be provided to the source follower transistor SF.

Figure 11:
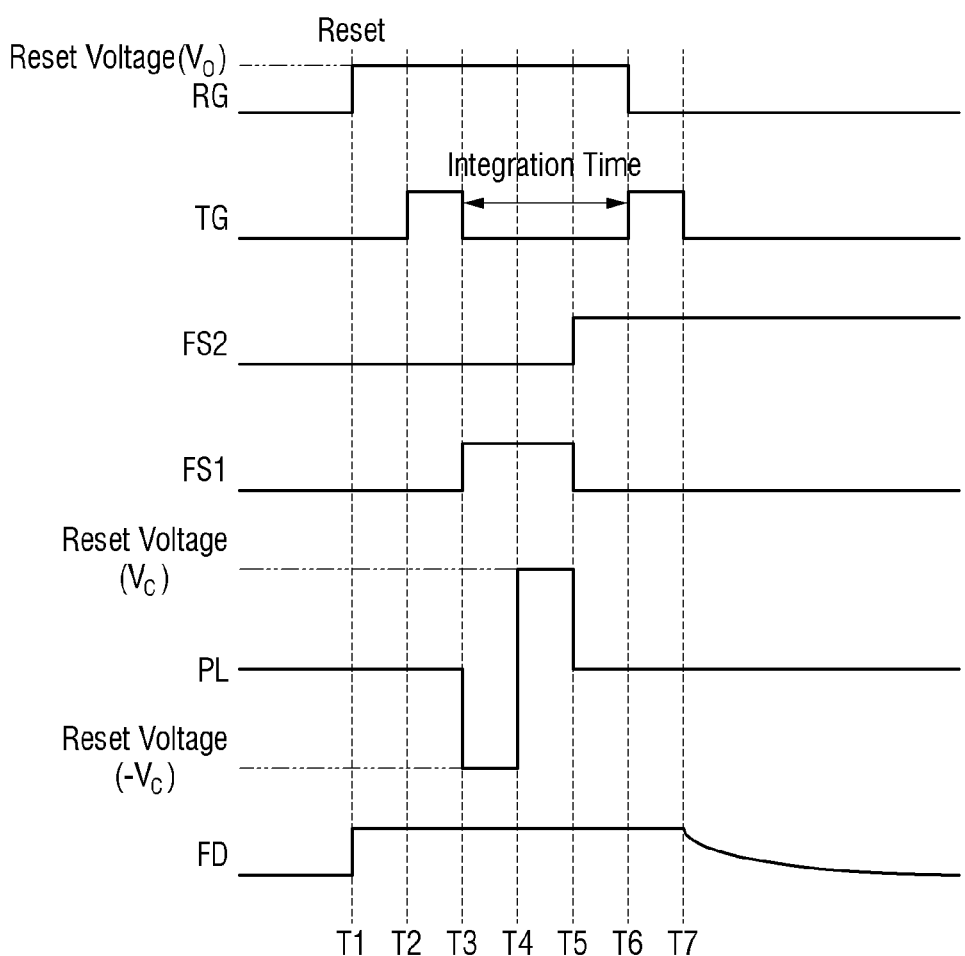
FIG. 11 is a timing diagram for explaining an operation of an image sensor according to an embodiment.

FIG. 11 is a timing diagram for explaining an operation of an image sensor according to some embodiments. Specifically, FIG. 11 is a timing diagram for explaining an operation of an image sensor in a second conversion gain mode that corresponds to a low conversion gain of the image sensor.

Referring to FIG. 11, a reset transistor RG may be turned on at a first time point T1. The reset transistor RG may be turned on and reset the floating diffusion node FD to a reset voltage Vo. That is, the reset voltage Vo may mean a driving voltage VDD shown in FIG. 9. In response to the reset transistor RG being turned on, a voltage level of the floating diffusion node FD may rise.

At a second time point T2, the transfer transistor TG may be turned on. The transfer transistor TG is turned on to discharge charges remaining in the photoelectric converter.

At a third time point T3, the transfer transistor TG may be turned off and the first transistor FS1 may be turned on. That is, in FIG. 9, the first transistor FS1 may be turned on to transmit the voltage applied to the plate line PL to the ferroelectric capacitor FC. Meanwhile, also at the third time point T3, a ferroelectric capacitor reset voltage may be applied to the plate line PL. The magnitude of the ferroelectric capacitor reset voltage may be a negative saturation voltage of the ferroelectric capacitor shown in FIG. 8, and the magnitude of the negative saturation voltage may vary according to the embodiment.

At a fourth time point T4, the voltage being applied to the plate line PL may be converted into a positive saturation voltage from a negative saturation voltage. That is to say, the voltage applied to the plate line PL at the third time point T3 and the voltage applied to the plate line PL at the fourth time point T4 may mean voltages having the same magnitude but different signs.

At a fifth time point T5, the first transistor FS1 is turned off, and the voltage being applied to the plate line PL may be no longer applied. Also at a fifth time point T5, the second transistor FS2 may be turned on. As the second transistor FS2 is turned on, the floating diffusion node FD and the ferroelectric capacitor FC may be electrically connected to each other. Referring back to FIG. 8, the ferroelectric capacitor FC may have a value of the second capacitance (capacitance 2) due to the positive voltage applied to the plate line on the hysteresis curve.

At a sixth time point T6, the reset transistor RG may be turned off. At the sixth time point T6, the transfer transistor TG may be turned on. As the transfer transistor TG is turned on, charges generated in response to light received by the photoelectric converter may be provided to the floating diffusion node FD. The voltage caused by the charges provided to the floating diffusion node FD may have a low conversion gain due to the ferroelectric capacitor FC having a value of the second capacitance (capacitance 2).

At a seventh time point T7, the transfer transistor TG may be turned off. Hence, the voltage level of the floating diffusion node FD may be dropped by the charges provided from the photoelectric converter. At this time, the floating diffusion node FD may have the low conversion gain as a conversion gain, as described above, and a voltage level corresponding to the low conversion gain may be provided to the source follower transistor SF.

Figure 12:
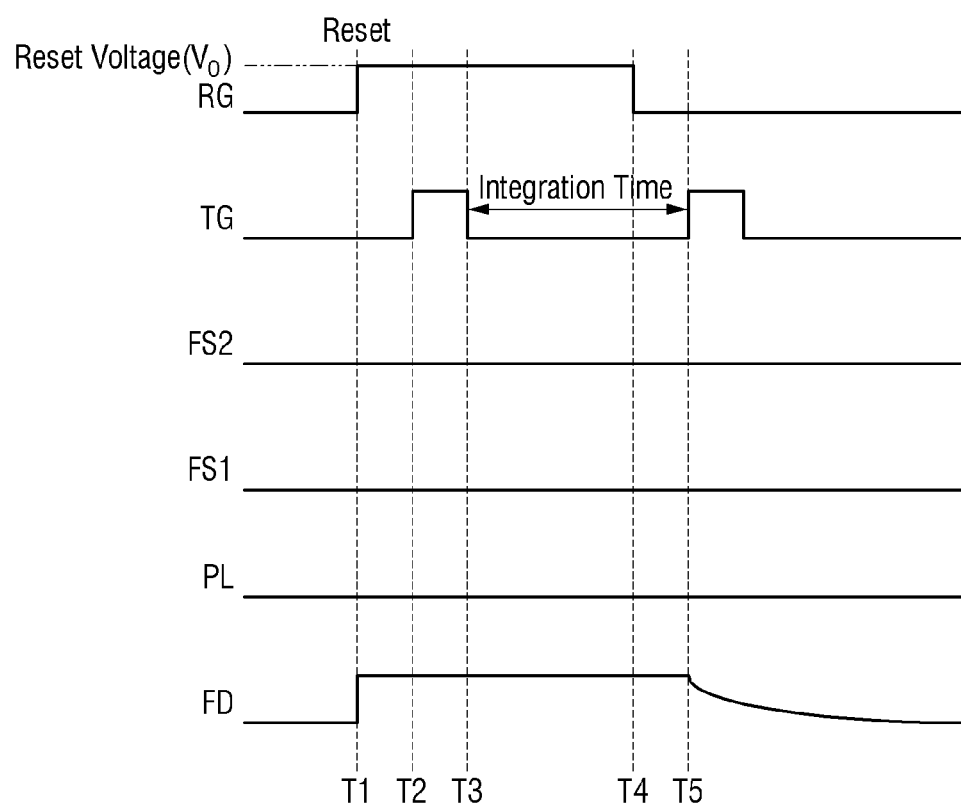
FIG. 12 is a timing diagram for explaining an operation of an image sensor according to an embodiment.

FIG. 12 is a timing diagram for explaining an operation of an image sensor according to some embodiments. Specifically, FIG. 12 is a timing diagram for explaining an operation of an image sensor in a third conversion gain mode that corresponds to a high conversion gain of the image sensor.

Referring to FIG. 12, a reset transistor RG may be turned on at a first time point T1. The reset transistor RG may be turned on and reset the floating diffusion node FD to a reset voltage Vo. That is, the reset voltage Vo may mean a driving voltage VDD shown in FIG. 9. In response to the reset transistor RG being turned on, a voltage level of the floating diffusion node FD may rise.

At a second time point T2, the transfer transistor TG may be turned on. The transfer transistor TG is turned on to discharge charges remaining in the photoelectric converter.

Unlike in the first and second conversion gain modes, in the third conversion gain mode, the first transistor FS1 and the second transistor FS2 may remain turned off. In other words, the floating diffusion node FD may remain electrically unconnected to the ferroelectric capacitor FC.

At a third time point T3, the transfer transistor TG may be turned off.

At a fourth time point T4, the reset transistor RG may be turned off. Also at a fourth time point T4, the transfer transistor TG may be turned on. As the transfer transistor TG is turned on, charges generated in response to light received by the photoelectric converter may be provided to the floating diffusion node FD. The voltage caused by the charges provided to the floating diffusion node FD may have a high conversion gain. Specifically, since the floating diffusion node FD is not electrically connected to the ferroelectric capacitor FC, the floating diffusion node FD may have a high conversion gain due to a parasitic capacitor existing in the interior of the floating diffusion node FD.

At a fifth time point T5, the transfer transistor TG may be turned off. Hence, the voltage level of the floating diffusion node FD may be dropped by the charges provided from the photoelectric converter. At this time, the floating diffusion node FD may have the high conversion gain as a conversion gain, as described above, and a voltage level corresponding to the high conversion gain may be provided to the source follower transistor SF.

As described above, the image sensor according to some embodiments of the disclosure may use the ferroelectric capacitor included therein to allow the floating diffusion node FD to have a different capacitance value according to each conversion gain mode. Specifically, in the high conversion mode in which only the internal parasitic capacitor exists, the highest conversion gain may be achieved; in the middle conversion mode in which the ferroelectric capacitor has a value of the first capacitance, the middle conversion gain may be achieved; and in the low conversion mode in which the ferroelectric capacitor has a value of the second capacitance greater than the value of the first capacitance, the lowest conversion gain may be achieved. However, embodiments are not limited to the three modes described above, and the number of conversion gain modes may be changed.

Figure 13:
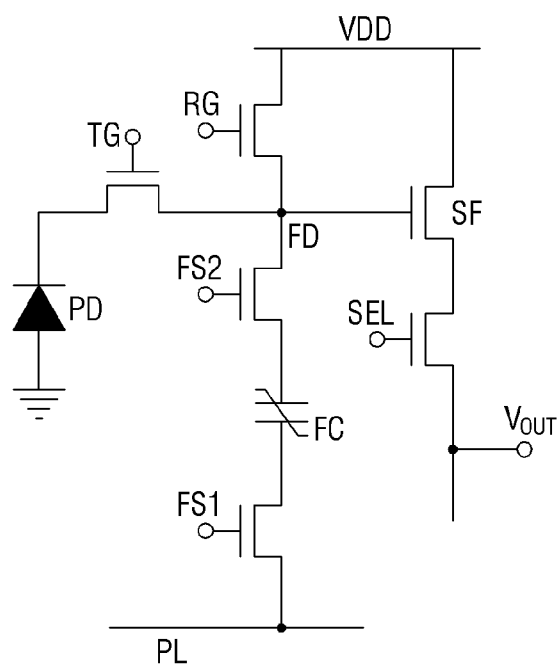
FIG. 13 is a circuit diagram of a unit pixel included in an image sensor according to an embodiment.

FIG. 13 is a circuit diagram of a unit pixel included in an image sensor according to some embodiments. Descriptions of the same features or elements as those in the embodiments of FIGS. 2 to 6 will be omitted and differences from FIGS. 2 to 6 will be mainly described.

Referring to FIG. 13, an image sensor may further include a first transistor FS1, a second transistor FS2, a ferroelectric capacitor FC, and a plate line PL.

One end of the first transistor FS1 may be connected to one end of the ferroelectric capacitor FC. The other end of the first transistor FS1 may be connected to the plate line PL.

One end of the second transistor FS2 may be connected to the other end of the ferroelectric capacitor FC. The other end of the second transistor FS2 may be connected to the floating diffusion node FD.

One end of the ferroelectric capacitor FC may be connected to the one end of the first transistor FS1. The other end of the ferroelectric capacitor FC may be connected to the one end of second first transistor FS2. In other words, the ferroelectric capacitor FC and the first transistor FS1 may be connected in series to each other.

The plate line PL may be configured to apply a bias voltage that determines operations of the first transistor FS1, the ferroelectric capacitor FC, and the second transistor FS2, but embodiments are not limited thereto Although FIG. 13 illustrates that the first transistor FS1 and the second transistor FS2 are NMOS, embodiments are not limited thereto.

Figure 14:
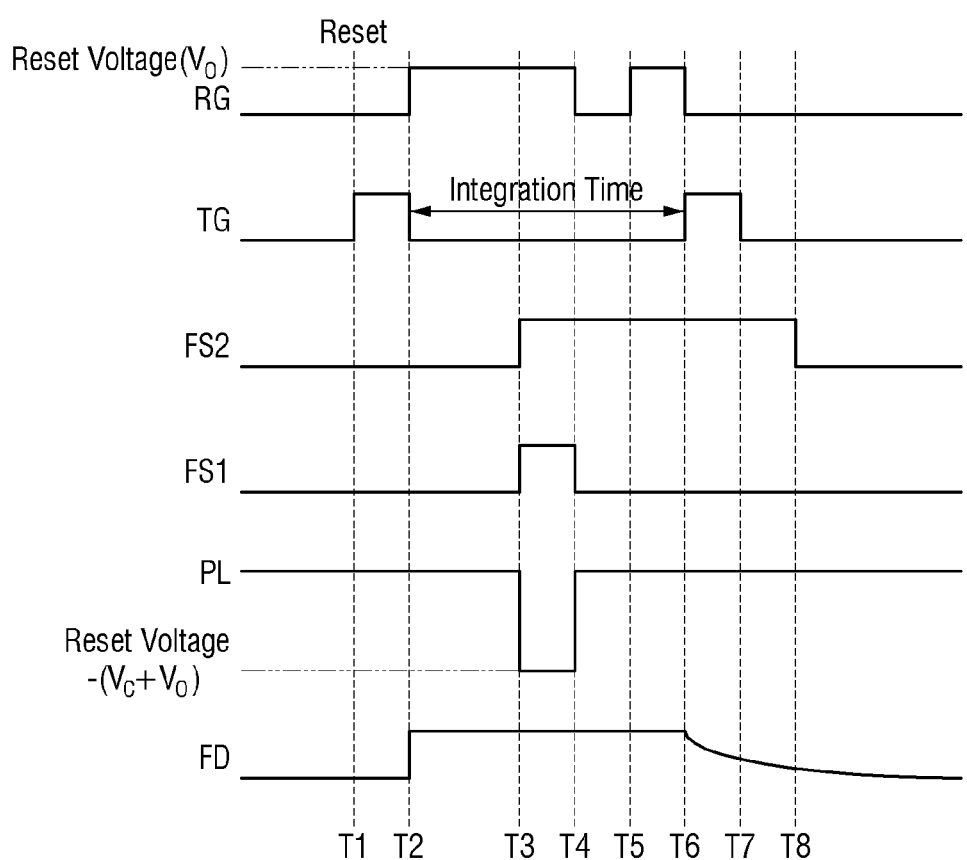
FIG. 14 is a timing diagram for explaining an operation of an image sensor according to an embodiment.

FIG. 14 is a timing diagram for explaining an operation of an image sensor according to some embodiments. Specifically, FIG. 14 is a timing diagram for explaining an operation of an image sensor in the first conversion mode that corresponds to a middle conversion gain of the image sensor.

Referring to FIG. 14, a transfer transistor TG may be turned on at a first time point T1. The transfer transistor TG is turned on to discharge charges remaining in the photoelectric converter.

At a second time point T2, the transfer transistor TG may be turned off. At the second time point T2, the reset transistor RG may be turned on. The reset transistor RG may be turned on and reset the floating diffusion node FD to a reset voltage Vo. That is, the reset voltage Vo may mean a driving voltage VDD shown in FIG. 9. In response to the reset transistor RG being turned on, a voltage level of the floating diffusion node FD may rise.

At a third time point T3, the first transistor FS1 and the second transistor FS2 may be turned on. As the first transistor FS1 is turned on, the voltage applied to the plate line may be transmitted to the ferroelectric capacitor FC. Also, as the second transistor FS2 is turned on, the voltage of the floating diffusion node FD may be transmitted to the ferroelectric capacitor FC. The ferroelectric capacitor FC may operate based on a difference between the ferroelectric capacitor reset voltage of the plate line PL provided from the first transistor FS1 and the voltage of the floating diffusion node FD provided from the second transistor FS2.

Meanwhile, also at the third time point T3, a ferroelectric capacitor reset voltage may be applied to the plate line PL. The magnitude of the ferroelectric capacitor reset voltage may have a value equal to a negative value of the sum of the saturation voltage of the ferroelectric capacitor shown in FIG. 8 and the reset voltage Vo to which the floating diffusion node FD is reset, but embodiments are not limited thereto.

In this case, the ferroelectric capacitor FC may operate on the hysteresis curve due to a difference between the voltage of the plate line PL provided from the first transistor FS1 and the reset voltage Vo of the floating diffusion node FD provided from the second transistor FS2. Specifically, the ferroelectric capacitor FC may have a value of the first capacitance (capacitance 1) in FIG. 8 due to the aforementioned difference.

At a fourth time point T4, the first transistor FS1 is turned off, and the voltage being applied to the plate line PL may be no longer applied. At a fourth time point T4, the reset transistor RG may be turned off.

At a fifth time point T5, the reset transistor RG may be turned on again. Specifically, the reset transistor RG may be turned on again to minimize the voltage amplitude swing of the floating diffusion node FD due to the turn-on and turn-off operations of the first transistor FS1 and the second transistor FS2.

At a sixth time point T6, the reset transistor RG may be turned off. Also at the sixth time point T6, the transfer transistor TG may be turned on. As the transfer transistor TG is turned on, charges generated in response to light received by the photoelectric converter may be provided to the floating diffusion node FD. Hence, the voltage level of the floating diffusion node FD may be dropped by the charges provided from the photoelectric converter. The voltage caused by the charges provided to the floating diffusion node FD may have a middle conversion gain due to the ferroelectric capacitor FC having a value of the first capacitance (capacitance 1).

At a seventh time point T7, the transfer transistor TG may be turned off. At this time, the floating diffusion node FD may have the middle conversion gain as a conversion gain, as described above, and a voltage level corresponding to the middle conversion gain may be provided to the source follower transistor SF.

At an eighth time point T8, the second transistor FS2 may be turned off.

Figure 15:
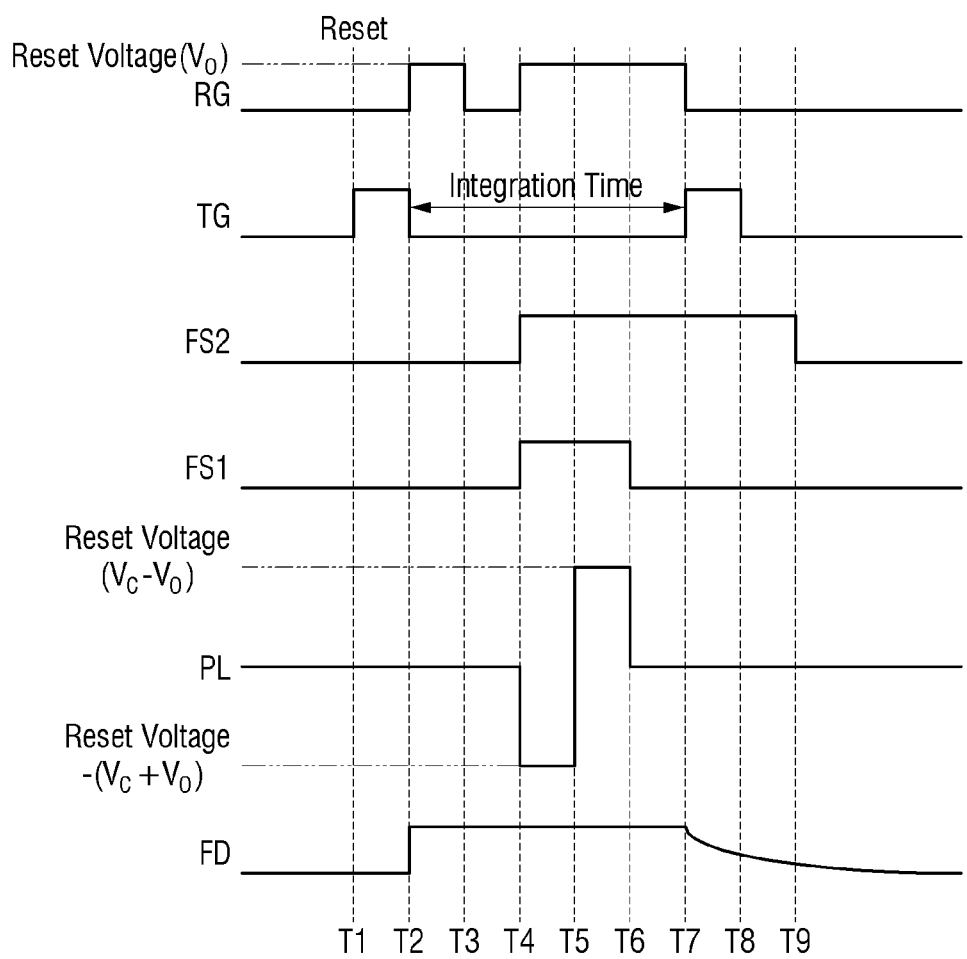
FIG. 15 is a timing diagram for explaining an operation of an image sensor according to an embodiment.

FIG. 15 is a timing diagram for explaining an operation of an image sensor according to some embodiments. Specifically, FIG. 15 is a timing diagram for explaining an operation of an image sensor in the second conversion mode that corresponds to a low conversion gain of the image sensor.

Referring to FIG. 15, a transfer transistor TG may be turned on at a first time point T1. The transfer transistor TG is turned on to discharge charges remaining in the photoelectric converter.

At a second time point T2, the transfer transistor TG may be turned off. At the second time point T2, the reset transistor RG may be turned on. The reset transistor RG may be turned on and reset the floating diffusion node FD to a reset voltage Vo. That is, the reset voltage Vo may mean a driving voltage VDD shown in FIG. 9. In response to the reset transistor RG being turned on, a voltage level of the floating diffusion node FD may rise.

At a third time point T3, the reset transistor RG may be turned off.

At a fourth time point T4, the reset transistor RG may be turned on again. Also at the fourth time point T4, the first transistor FS1 and the second transistor FS2 may be turned on. As the first transistor FS1 is turned on, the voltage applied to the plate line may be transmitted to the ferroelectric capacitor FC. Also, as the second transistor FS2 is turned on, the voltage of the floating diffusion node FD may be transmitted to the ferroelectric capacitor FC. The ferroelectric capacitor FC may operate based on a difference between the ferroelectric capacitor reset voltage of the plate line PL provided from the first transistor FS1 and the voltage of the floating diffusion node FD provided from the second transistor FS2.

Meanwhile, at the fourth time point T4, a ferroelectric capacitor reset voltage (e.g., a first ferroelectric capacitor reset voltage) may be applied to the plate line PL. The magnitude of the ferroelectric capacitor reset voltage may have a value equal to a negative value of the sum of the saturation voltage of the ferroelectric capacitor shown in FIG. 8 and the reset voltage Vo to which the floating diffusion node FD is reset, but embodiments are not limited thereto.

At a fifth time point T5, the voltage being applied to the plate line PL may have a positive ferroelectric capacitor reset voltage (e.g., a second ferroelectric capacitor reset voltage).

In this case, the ferroelectric capacitor FC may operate on the hysteresis curve due to a difference between the voltage of the plate line PL provided from the first transistor FS1 and the reset voltage Vo of the floating diffusion node FD provided from the second transistor FS2. Specifically, the ferroelectric capacitor FC may have a value of the second capacitance (capacitance 2) in FIG. 8 due to the aforementioned difference.

At a sixth time point T6, the first transistor FS1 is turned off, and the voltage being applied to the plate line PL may be no longer applied.

At a seventh time point T7, the reset transistor RG may be turned off. Also at the seventh time point T7, the transfer transistor TG may be turned on. As the transfer transistor TG is turned on, charges generated in response to light received by the photoelectric converter may be provided to the floating diffusion node FD. Hence, the voltage level of the floating diffusion node FD may be dropped by the charges provided from the photoelectric converter. The voltage caused by the charges provided to the floating diffusion node FD may have a low conversion gain due to the ferroelectric capacitor FC having a value of the second capacitance (capacitance 2).

At an eighth time point T8, the transfer transistor TG may be turned off. At this time, the floating diffusion node FD may have the low conversion gain as a conversion gain, as described above, and a voltage level corresponding to the low conversion gain may be provided to the source follower transistor SF.

At a ninth time point T9, the second transistor FS2 may be turned off.

Figure 16:
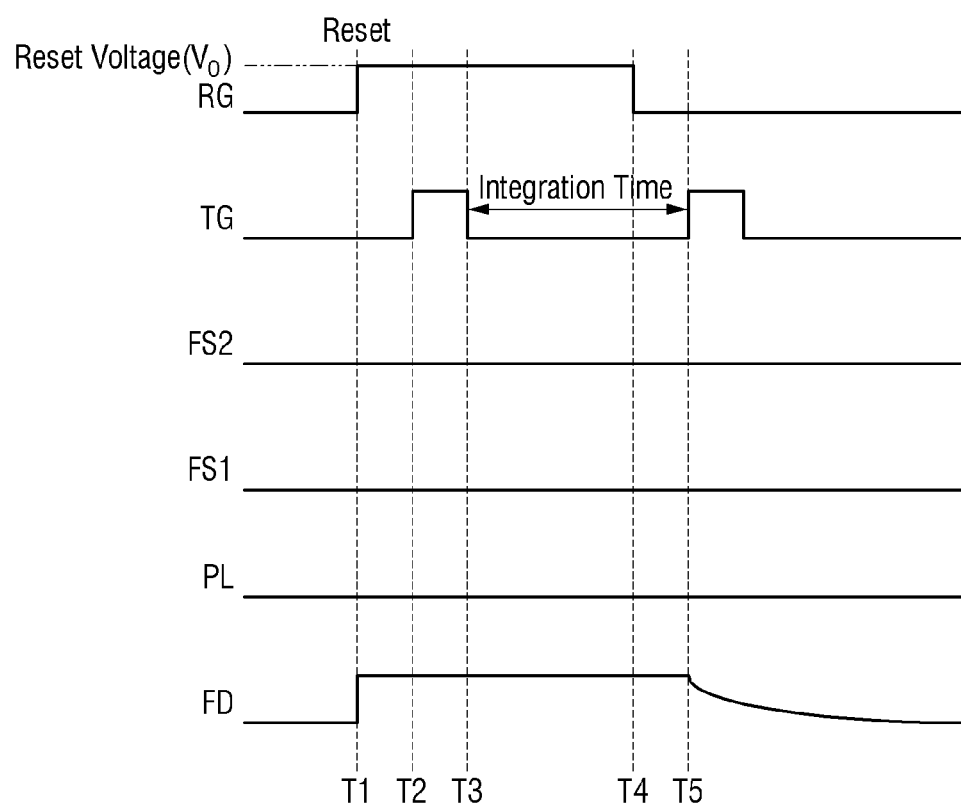
FIG. 16 is a timing diagram for explaining an operation of an image sensor according to an embodiment.

FIG. 16 is a timing diagram for explaining an operation of an image sensor according to some embodiments. Specifically, FIG. 16 is a timing diagram for explaining an operation of an image sensor in the third conversion mode that corresponds to a high conversion gain of the image sensor.

Referring to FIG. 16, the reset transistor RG may be turned on at a first time point T1. The reset transistor RG may be turned on and reset the floating diffusion node FD to a reset voltage Vo. That is, the reset voltage Vo may mean a driving voltage VDD shown in FIG. 9. In response to the reset transistor RG being turned on, a voltage level of the floating diffusion node FD may rise.

At a second time point T2, the transfer transistor TG may be turned on. The transfer transistor TG is turned on to discharge charges remaining in the photoelectric converter.

Unlike in the first and second conversion modes, in the third conversion mode, the first transistor FS1 and the second transistor FS2 may remain turned off. In other words, the floating diffusion node FD may remain electrically unconnected to the ferroelectric capacitor FC.

At a third time point T3, the transfer transistor TG may be turned off.

At a fourth time point T4, the reset transistor RG may be turned off. Also at the fourth time point T4, the transfer transistor TG may be turned on. As the transfer transistor TG is turned on, charges generated in response to light received by the photoelectric converter may be provided to the floating diffusion node FD. The voltage caused by the charges provided to the floating diffusion node FD may have a high conversion gain. Specifically, since the floating diffusion node FD is not electrically connected to the ferroelectric capacitor FC, the floating diffusion node FD may have a high conversion gain due to a parasitic capacitor existing in the interior of the floating diffusion node FD.

At a fifth time point T5, the transfer transistor TG may be turned off. Hence, the voltage level of the floating diffusion node FD may be dropped by the charges provided from the photoelectric converter. At this time, the floating diffusion node FD may have the high conversion gain as a conversion gain, as described above, and a voltage level corresponding to the high conversion gain may be provided to the source follower transistor SF.

Figure 17:
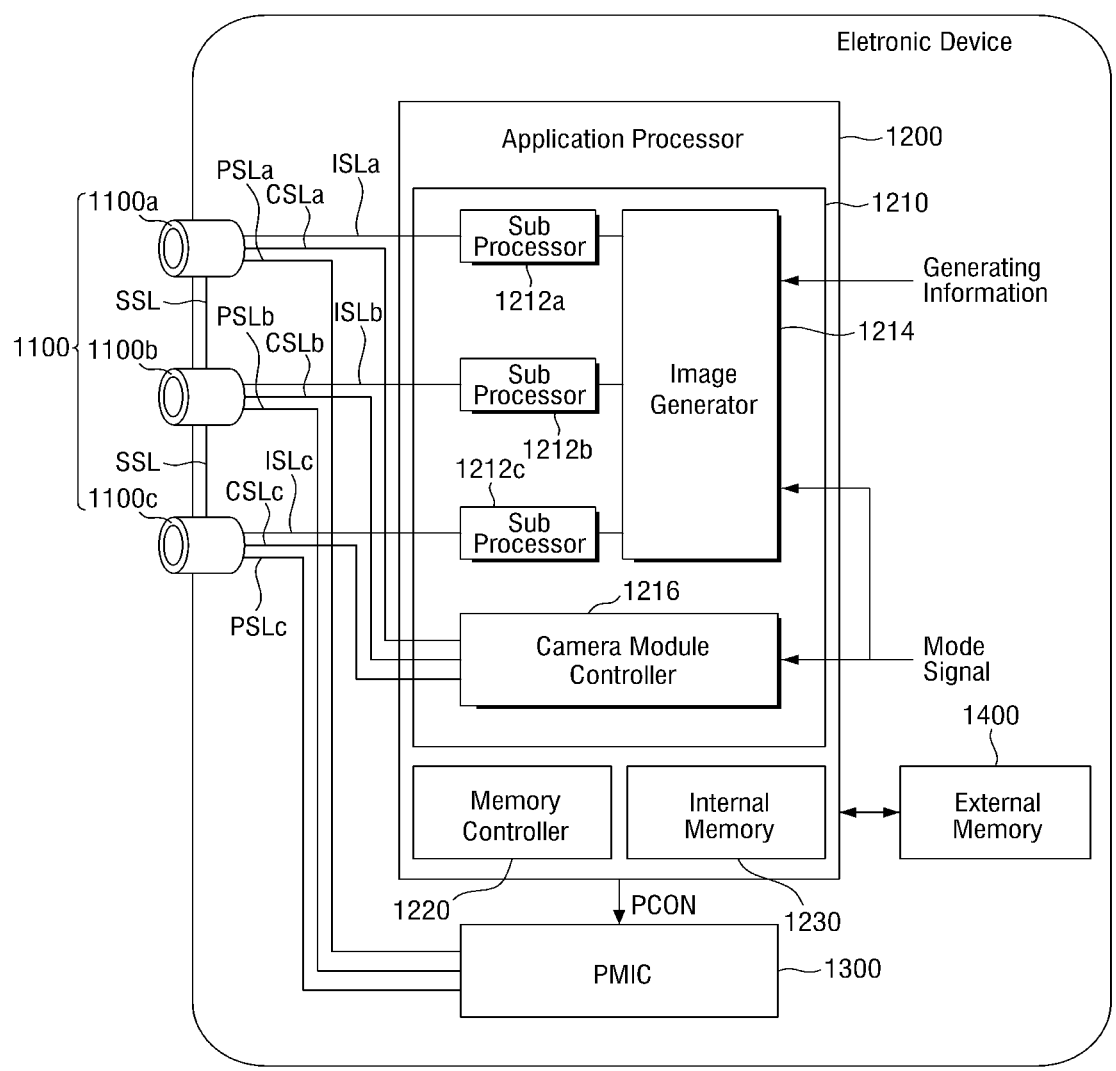
FIG. 17 is a block diagram illustrating an electronic device including multi-camera modules according to an embodiment.
Figure 18:
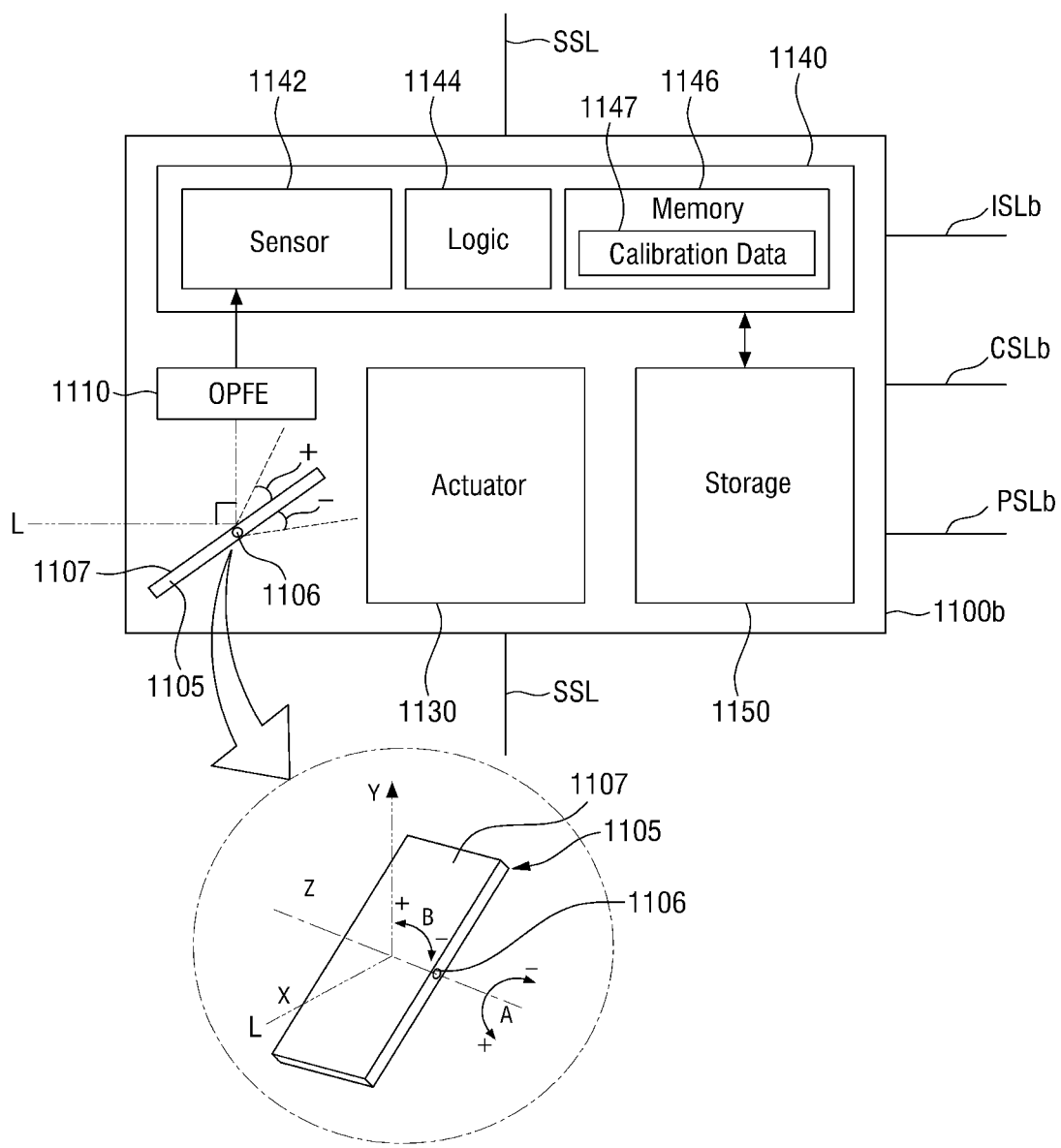
FIG. 18 is a block diagram illustrating in detail the camera module of FIG. 17.

FIG. 17 is a block diagram illustrating an electronic device including multi-camera modules. FIG. 18 is a block diagram illustrating in detail one of the camera modules of FIG. 17.

Hereinafter, an electronic device 1000 according to some embodiments will be described with reference to FIGS. 17 and 18. For convenience of explanation, descriptions of the same features or elements as those in the embodiments of FIGS. 1 to 16 will be omitted or at least simplified.

Referring to FIG. 17, the electronic device 1000 may include a camera module group 1100, an application processor 1200, a power management integrated circuit (PMIC) 1300, and an external memory 1400.

The camera module group 1100 may include a plurality of camera modules 1100a, 1100b, and 1100c. Although the drawings illustrate an embodiment in which three camera modules 1000a, 1000b, and 1000c are arranged, embodiments are not limited thereto. In some embodiments, the camera module group 100 may include only two camera modules. In some embodiments, the camera module group 1100 may include n (where n is an integer of 4 or greater) camera modules.

Here, any one or more of the three camera modules 1100a, 1100b, and 1100c may include the image sensor 100 described with reference to FIGS. 1 to 16.

The detailed configuration of the camera module 1100b will now be described in more detail with reference to FIG. 18, but the following description may also be applied to the other camera modules 1100a and 1100c according to embodiments.

Referring to FIG. 18, the camera module 1100b may include a prism 1105, an optical path folding element (hereinafter, "OPFE") 1110, an actuator 1130, an image sensing device 1140, and a storage 1150.

The prism 1105 may include a reflective surface 1107 of a light reflecting material to modify the path of light L incident from the outside.

In some embodiments, the prism 1105 may change the path of light L incident in a first direction X to a second direction Y perpendicular to the first direction X. Moreover, the prism 1105 may rotate the reflective surface 1107 of the light reflecting material in A direction or B direction around a center axis 1106, thereby changing the path of the light L incident in the first direction X to the second direction Y perpendicular to the first direction X. At this time, the OPFE 1110 may also move in a third direction Z perpendicular to the first direction X and the second direction Y. At this time, the OPFE 1110 may also move in the third direction Z perpendicular to the first direction X and second direction Y.

In some embodiments, as shown in FIG. 18, the maximum rotatable angle of the prism 1105 in the A direction may be less than or equal to 15 degrees in the positive (+) A direction and may be greater than 15 degrees in the negative (−) A direction. However, embodiments are not limited thereto.

In some embodiments, the prism 1105 may be rotated by around 20 degrees, between 10 degrees and 20 degrees, or between 15 degrees and 20 degrees in the positive (+) or negative (−) B direction. Here, the prism 1105 may be rotated by the same angles or similar angles by around 1 degree in the positive (+) B direction and the negative (−) B direction.

In some embodiments, the prism 1105 may move the reflective surface 1106 of the light reflecting material in the third direction (e.g., the direction Z) parallel to the direction in which the center axis 1106 extends.

For example, the OPFE 1110 may include optical lenses including m (where m is an integer) groups. A plurality, e.g., m, of lenses may move in the second direction Y and change the optical zoom ratio of the camera module 1100b. For example, when the basic optical zoom ratio of the camera module 1100b is Z and them optical lenses included in the OPFE 1110 are moved, the optical zoom ratio of the camera module 1100b may be changed to 3Z, 5Z, or an optical zoom ratio higher than 5Z.

The actuator 1130 may move the OPFE 1110 or the optical lenses (hereinafter referred to as an optical lens) to a particular position. For example, the actuator 1130 may adjust the position of the optical lens such that the image sensor 1142 is positioned at the focal length of the optical lens for accurate sensing.

The image sensing device 1140 may include the image sensor 1142, a control logic 1144, and a memory 1146. The image sensor 1142 may sense an image of a sensing target by using the light L provided through the optical lens. The control logic 1144 may control the overall operation of the camera module 1100b. For example, the control logic 1144 may control the operation of the camera module 1100b in response to a control signal provided through a control signal line CSLb.

The memory 1146 may store information, such as calibration data 1147, necessary for the operation of the camera module 1100b. The calibration data 1147 may include information necessary for the camera module 1100b to generate image data by using the light L provided from the outside. The calibration data 1147 may include, for example, information on a degree of rotation described above, information on a focal length, information on an optical axis, or the like. When the camera module 1100b is implemented in the form of a multi-state camera in which the focal length is changed depending on the position of an optical lens, the calibration data 1147 may include focal distance values for respective positions or states of the optical lens and information related to automatic focusing.

The storage 1150 may store image data sensed through the image sensor 1142. The storage 1150 may be provided outside the image sensing device 1140 and may be stacked with a sensor chip constituting the image sensing device 1140. In some embodiments, the storage 1150 may be implemented with an electrically erasable programmable read-only memory (EEPROM), but embodiments are not limited thereto.

Referring to FIGS. 17 and 18 together, in some embodiments, each of the plurality of camera modules 1100a, 1100b, and 1100c may include the actuator 1130. Therefore, the camera modules 1100a, 1100b, and 1100c may include the same or different calibration data 1147 according to the operation of actuators 1130 included therein.

In some embodiments, one camera module (e.g., the camera module 1100b) from among the plurality of camera modules 1100a, 1100b, and 1100c may be a folded lens type camera module including the prism 1105 and the OPFE 1110 as described above, and the other camera modules (e.g., the camera modules 1100a and 1100c) may be vertical type camera modules without the prism 1105 and the OPFE 1110. However, embodiments are not limited thereto.

In some embodiments, one camera module (e.g., the camera module 1100c) from among the plurality of camera modules 1100a, 1100b, and 1100c may be, for example, a vertical type depth camera that extracts depth information by using an infrared ray (IR). In this case, the application processor 1200 may generate a 3D depth image by merging image data provided from such a depth camera with image data provided from another camera module (e.g., the camera module 1100a or the camera module 1100b).

In some embodiments, at least two camera modules (e.g., the camera module 1100a and the camera module 1100b) from among the plurality of camera modules 1100a, 1100b, and 1100c may have different fields of view (FOVs) from each other. In this case, for example, at least two camera modules (e.g., the camera module 1100a and the camera module 1100b) from among the plurality of camera modules 1100a, 1100b, and 1100c may have different optical lenses from each other, but the disclosure is not limited thereto.

Also, in some embodiments, the camera modules 1100a, 1100b, and 1100c may have different FOVs from one another. In this case, optical lenses included in the camera modules 1100a, 1100b, and 1100c may also be different from one another, but the disclosure is not limited thereto.

In some embodiments, the camera modules 1100a, 1100b, and 1100c may be physically separated from one another. In other words, the sensing area of one image sensor 1142 is not segmented for use by the camera modules 1100a, 1100b, and 1100c. Rather, an independent image sensor 1142 may be disposed inside each of the camera modules 1100a, 1100b, and 1100c.

Referring back to FIG. 17, the application processor 1200 may include an image processing device 1210, a memory controller 1220, and an internal memory 1230. The application processor 1200 may be implemented separately from the plurality of camera modules 1100a, 1100b, and 1100c. For example, the application processor 1200 and the plurality of camera modules 1100a, 1100b, and 1100c may be implemented separately from each other as separate semiconductor chips.

The image processing device 1210 may include a plurality of sub-image processors 1212a, 1212b, and 1212c, an image generator 1214, and a camera module controller 1216.

The image processing device 1210 may include a number of sub-image processors 1212a, 1212b, and 1212c corresponding to the number of camera modules 1100a, 1100b, and 1100c.

Image data generated by the respective camera modules 1100a, 1100b, and 1100c may be respectively provided to the corresponding sub-image processors 1212a, 1212b, and 1212c through image signal lines ISLa, ISLb, and ISLc separated from one another. For example, image data generated from the camera module 1100a may be provided to the sub-image processor 1212a through the image signal line ISLa, image data generated from the camera module 1100b may be provided to the sub-image processor 1212b through the image signal line ISLb, and image data generated from the camera module 1100c may be provided to the sub-image processor 1212c through the image signal line ISLc. The image data may be transmitted by using, for example, a camera serial interface based on the mobile industry processor interface (MIPI), but embodiments are not limited thereto.

In some embodiments, one sub-image processor may be disposed to correspond to a plurality of camera modules. For example, the sub-image processor 1212a and the sub-image processor 1212c may be integrally implemented as a single sub-image processor, rather than being implemented as separate sub-image processors, and the image data provided from the camera module 1100a and the camera module 1100c may be selected by a selecting element (e.g., a multiplexer) and provided to an integrated sub-image processor.

The image data provided to each of the sub-image processors 1212a, 1212b, and 1212c may be provided to the image generator 1214. The image generator 1214 may generate an output image using the image data provided from each of the sub-image processors 1212a, 1212b, and 1212c according to image generation information (generating information) or a mode signal.

Specifically, the image generator 1214 may generate the output image by merging at least some of the image data generated by the camera modules 1100a, 1100b, and 1100c having different fields of view according to the generating information or the mode signal. Alternatively, the image generator 1214 may generate an output image by selecting any one of pieces of image data generated by the plurality of camera modules 1100a, 1100b, and 1100c having different fields of view, according to the generating information or the mode signal.

In some embodiments, the generating information may include a zoom signal or a zoom factor. In addition, in some embodiments, the mode signal may be, for example, a signal based on a mode selected by a user.

When the generating information is a zoom signal (or a zoom factor), and the plurality of camera modules 1100a, 1100b, and 1100c have observation sights (fields of view), the image generator 1214 may perform a different operation according to a type of the zoom signal. For example, when the zoom signal is a first signal, the image data output from the camera module 1100a and the image data output from the camera module 1100c may be merged, and both of the merged image signal and the image data output from the camera module 1100b (not used in merging) may be used to generate the output image. When the zoom signal is a second signal different from the first signal, the image generator 1214 may generate the output image by selecting any one of pieces of image data output from the respective camera modules 1100a, 1100b, and 1100c, without performing such image data merging. However, embodiments are not limited thereto, and a method of processing image data may be modified and carried out in accordance with circumstances.

In some embodiments, the image generator 1214 may generate merged image data having an increased dynamic range by receiving a plurality of pieces of image data having different exposure times from at least one of the plurality of sub-image processors 1212a, 1212b, and 1212c and performing high dynamic range (HDR) processing on the plurality of pieces of image data.

The camera module controller 1216 may provide control signals to the respective camera modules 1100a, 1100b, and 1100c. The control signals generated by the camera module controller 1216 may be provided to the corresponding camera modules 1100a, 1100b, and 1100c through control signal lines CSLa, CSLb, and CSLc separated from one another, respectively. For example, the control signals may include information regarding a conversion gain mode of the respective ferroelectric capacitor included in each of the camera modules 1100a, 1100b, and 1100c.

According to the generating information or the mode signal, any one of the plurality of camera modules 1100a, 1100b, and 1100c may be assigned as a master camera (e.g., 1100b), and the other camera modules (e.g., 1100a and 1100c) may be assigned as slave cameras. This information may be included in the control signals and provided to the corresponding camera modules 1100a, 1100b, and 1100c through the control signal lines CSLa, CSLb, and CSLc separated from one another.

Camera modules operating as a master camera and slave cameras may be changed according to a zoom factor or an operation mode signal. For example, when a field of view of the camera module 1100a is wider than a field of view of the camera module 1100b and the zoom factor indicates a low zoom ratio, the camera module 1100b may operate as a master camera and the camera module 1100a may operate as a slave camera. On the contrary, when the zoom factor indicates a high zoom ratio, the camera module 1100a may operate as a master camera, and the camera module 1100b may operate as a slave camera.

According to some embodiments, the control signals provided from the camera module controller 1216 to the respective camera modules 1100a, 1100b, and 1100c may include a sync enable signal. For example, when the camera module 1100b is a master camera, and the camera modules 1100a and 1100c are slave cameras, the camera module controller 1216 may transmit the sync enable signal to the camera module 1100b. The camera module 1100b that has received the sync enable signal may generate a sync signal based on the received sync enable signal and provide the generated sync signal to the camera modules 1100a and 1100c through a sync signal line SSL. The camera module 1100b and the camera modules 1100a and 1100c may be synchronized based on the sync signal and transmit image data to the application processor 1200.

In some embodiments, the control signals provided from the camera module controller 1216 to the plurality of camera modules 1100a, 1100b, and 1100c may include mode information according to the mode signal. The plurality of camera modules 1100a, 1100b, and 1100c may operate in a first operation mode and a second operation mode in relation to a sensing rate based on the mode information.

In the first operation mode, the plurality of camera modules 1100a, 1100b, and 1100c may generate an image signal at a first rate (e.g., generate the image signal having a first frame rate), encode the generated image signal at a second rate that is higher than the first rate (e.g., encode the image signal having a second frame rate that is higher than the first frame rate), and transmit the encoded image signal to the application processor 1200. Here, the second rate may be 30 or less times the first rate.

The application processor 1200 may store the received image signal, that is, the encoded image signal, in the memory 1230 included therein or in the storage 1400 external to the application processor 1200, followed by reading the encoded image signal from the memory 1230 or the storage 1400 and decoding the read image signal, and then, may display image data generated based on the decoded image signal. For example, a corresponding sub-image processor among the plurality of sub-image processors 1212a, 1212b, and 1212c of the image processing device 1210 may perform decoding and may perform image processing on the decoded image signal.

In the second operation mode, each of the plurality of camera modules 1100a, 1100b, and 1100c may generate an image signal at a third rate that is lower than the first rate (for example, generate an image signal having a third frame rate that is lower than the first frame rate) and may transmit the image signal to the application processor 1200. The image signal provided to the application processor 1200 may be a signal that is not encoded. The application processor 1200 may perform image processing on the received image signal or may store the image signal in the memory 1230 or the storage 1400.

The PMIC 1300 may provide power, for example, a supply voltage, to each of the plurality of camera modules 1100a, 1100b, and 1100c. For example, under the control of the application processor 1200, the PMIC 1300 may supply first power to the camera module 1100*a* through a power signal line PSLa, supply second power to the camera module 1100*b* through a power signal line PSLb, and supply third power to the camera module 1100*c* through a power signal line PSLc.

In response to a power control signal PCON from the application processor 1200, the PMIC 1300 may generate power corresponding to each of the plurality of camera modules 1100*a*, 1100*b*, and 1100*c* and adjust a level of the power. The power control signal PCON may include a power adjustment signal for each operation mode of the plurality of camera modules 1100*a*, 1100*b*, and 1100*c*. For example, the operation mode may include a low power mode, and here, the power control signal PCON may include information regarding a camera module operated in the lower power mode and regarding a power level set in the lower power mode. The plurality of camera modules 1100*a*, 1100*b*, and 1100*c* may be supplied with the same level or different levels of power. In addition, the level of the power may be dynamically changed.

While the disclosure has been particularly illustrated and described with reference to example embodiments thereof, it will be understood by those of ordinary skill in the art that various changes in form and detail may be made therein without departing from the spirit and scope of the disclosure as defined by the following claims. Example embodiments should be considered in a descriptive sense only and not for purposes of limitation.

What is claimed:

1. An image sensor comprising:
    a photoelectric converter configured to convert received light into charges in response to the received light and provide the charges to a first node;
    a transfer transistor configured to provide a voltage of the first node to a floating diffusion node;
    a reset transistor configured to reset a voltage of the floating diffusion node to a driving voltage based on a reset signal;
    a source follower transistor configured to provide a unit pixel output based on the voltage of the floating diffusion node;
    a select transistor connected to the source follower transistor and gated with a selection signal to output the unit pixel output to the outside; and
    a ferroelectric capacitor connected to the floating diffusion node,
    wherein the ferroelectric capacitor is configured to adjust a conversion gain of the floating diffusion node based on a conversion gain mode of the ferroelectric capacitor, the conversion gain mode being a first conversion gain mode, a second conversion gain mode, or a third conversion gain mode.

2. The image sensor of claim 1, further comprising:
    a first transistor having one end connected to one end of the ferroelectric capacitor and the other end connected to a plate line; and
    a second transistor having one end connected to the one end of the ferroelectric capacitor and the other end connected to the floating diffusion node,
    wherein the other end of the ferroelectric capacitor is connected to a ground source.

3. The image sensor of claim 2, wherein in the first conversion gain mode:
    the first transistor is turned on at a first time point that is before provision of the voltage of the first node to the floating diffusion node,
    the second transistor is turned on at a second time point that is after the first time point, and
    a ferroelectric capacitor reset voltage is applied to the plate line at the first time point.

4. The image sensor of claim 3, wherein a magnitude of the ferroelectric capacitor reset voltage is equal to a negative saturation voltage value of the ferroelectric capacitor.

5. The image sensor of claim 2, wherein in the second conversion gain mode:
    the first transistor is turned on at a first time point that is before provision of the voltage of the first node to the floating diffusion node, and is turned off at a second time point that is after the first time point,
    the second transistor is turned on at the second time point, and
    a first ferroelectric capacitor reset voltage is applied to the plate line at the first time point and a second ferroelectric capacitor reset voltage, different from the first ferroelectric capacitor reset voltage, is applied to the plate line at a third time point between the first time point and the second time point.

6. The image sensor of claim 5, wherein a magnitude of the first ferroelectric capacitor reset voltage at the first time point is equal to a negative saturation voltage value of the ferroelectric capacitor and a magnitude of the second ferroelectric capacitor reset voltage at the third time point is equal to a positive saturation voltage value of the ferroelectric capacitor.

7. The image sensor of claim 2, wherein in the third conversion gain mode, the first transistor and the second transistor are turned off.

8. The image sensor of claim 1, further comprising:
    a first transistor having one end connected to one end of the ferroelectric capacitor and the other end connected to a plate line; and
    a second transistor having one end connected to the other end of the ferroelectric capacitor and the other end connected to the floating diffusion node.

9. The image sensor of claim 1, wherein the ferroelectric capacitor comprises at least one of HFOx, HfO2/ZrO2, or PbTiO3.

10. An image sensing system comprising:
    an image sensor configured to output an image signal; and
    an image signal processor (ISP) electrically connected to the image sensor and configured to receive the image signal from the image sensor and process the image signal,
    wherein the image sensor comprises:
        a photoelectric converter configured to convert received light into charges in response to the received light and provide the charges to a first node,
        a transfer transistor configured to provide a voltage of the first node to a floating diffusion node,
        a reset transistor configured to reset a voltage of the floating diffusion node to a driving voltage based on a reset signal, and
        a ferroelectric capacitor connected to the floating diffusion node,
    wherein the ferroelectric capacitor is configured to adjust a conversion gain of the floating diffusion node based on a conversion gain mode of the ferroelectric capacitor, the conversion gain mode being a first conversion gain mode, a second conversion gain mode, or a third conversion gain mode.

11. The image sensing system of claim 10, further comprising:
   a first transistor having one end connected to one end of the ferroelectric capacitor and the other end connected to a plate line; and
   a second transistor having one end connected to the one end of the ferroelectric capacitor and the other end connected to the floating diffusion node,
   wherein the other end of the ferroelectric capacitor is connected to a ground source.

12. The image sensing system of claim 11, wherein in the first conversion gain mode:
   the first transistor is turned on at a first time point that is before provision of the voltage of the first node to the floating diffusion node,
   the second transistor is turned on at a second time point that is after the first time point, and
   a ferroelectric capacitor reset voltage is applied to the plate line at the first time point.

13. The image sensing system of claim 12, wherein a magnitude of the ferroelectric capacitor reset voltage is equal to a negative saturation voltage value of the ferroelectric capacitor.

14. The image sensing system of claim 11, wherein in the second conversion gain mode:
   the first transistor is turned on at a first time point that is before provision of the voltage of the first node to the floating diffusion node, and is turned off at a second time point that is after the first time point,
   the second transistor is turned on at the second time point, and
   a first ferroelectric capacitor reset voltage is applied to the plate line at the first time point and a second ferroelectric capacitor reset voltage, different from the first ferroelectric capacitor reset voltage, is applied to the plate line at a third time point between the first time point and the second time point.

15. The image sensing system of claim 14, wherein a magnitude of the first ferroelectric capacitor reset voltage at the first time point is equal to a negative saturation voltage value of the ferroelectric capacitor and a magnitude of the second ferroelectric capacitor reset voltage at the third time point is equal to a positive saturation voltage value of the ferroelectric capacitor.

16. The image sensing system of claim 11, wherein in the third conversion gain mode, the first transistor and the second transistor are turned off.

17. The image sensing system of claim 10, further comprising:
   a first transistor having one end connected to one end of the ferroelectric capacitor and the other end connected to a plate line; and
   a second transistor having one end connected to the other end of the ferroelectric capacitor and the other end connected to the floating diffusion node.

18. The image sensing system of claim 10, wherein the ferroelectric capacitor comprises at least one of HFOx, HfO2/ZrO2, or PbTiO3.

19. An image sensing method in which a ferroelectric capacitor having one end connected to a floating diffusion node and the other end connected to a ground source, a first transistor having one end connected to the one end of the ferroelectric capacitor and the other end connected to a plate line, and a second transistor having one end connected to the one end of the ferroelectric capacitor and the other end connected to the floating diffusion node are provided, the image sensing method comprising:
   adjusting a conversion gain of the floating diffusion node by operations of the ferroelectric capacitor, the first transistor, and the second transistor, wherein the conversion gain is adjusted based on a conversion gain mode of the ferroelectric capacitor, the conversion gain mode being a first conversion gain mode, a second conversion gain mode, or a third conversion gain mode,
   wherein in to the first conversion gain mode, the image sensing method comprises:
      turning on the first transistor at a first time point that is before provision of charges, which are generated in response to received light, to the floating diffusion node,
      turning on the second transistor at a second time point that is after the first time point, and
      applying a ferroelectric capacitor reset voltage to the plate line at the first time point,
   wherein in the second conversion gain mode, the image sensing method comprises:
      turning on the first transistor at a third time point that is before the provision of charges, which are generated in response to the received light, to the floating diffusion node, and turning off the first transistor at a fourth time point that is after the third time point, and
      applying a first ferroelectric capacitor reset voltage to the plate line at the third time point and applying a second ferroelectric capacitor reset voltage, different from the first ferroelectric capacitor reset voltage, to the plate line at a fifth time point between the third time point and the fourth time point, and
   wherein in the third conversion gain mode, the image sensing method comprises turning off the first transistor and the second transistor.

20. The image sensing method of claim 19, wherein the ferroelectric capacitor comprises at least one of HFOx, HfO2/ZrO2, or PbTiO3.

* * * * *